(12) United States Patent
Kwean

(10) Patent No.: US 7,221,573 B2
(45) Date of Patent: May 22, 2007

(54) VOLTAGE UP CONVERTER

(75) Inventor: Ki Chang Kwean, Icheon-Shi (KR)

(73) Assignee: Hynix Semiconductor Inc., Kyungki-Do (KR)

( * ) Notice: Subject to any disclaimer, the term of this patent is extended or adjusted under 35 U.S.C. 154(b) by 331 days.

(21) Appl. No.: 10/882,595

(22) Filed: Jun. 30, 2004

(65) Prior Publication Data

US 2005/0231985 A1    Oct. 20, 2005

(30) Foreign Application Priority Data

Apr. 20, 2004    (KR) .................... 10-2004-0027089

(51) Int. Cl.
*H02M 3/18* (2006.01)
*H02M 7/00* (2006.01)
*G11C 7/00* (2006.01)

(52) U.S. Cl. ........................................... 363/59; 363/60

(58) Field of Classification Search ................. 363/59, 363/60; 327/535, 536; 323/268, 271, 901; 365/189.08, 189.09, 189.11, 226
See application file for complete search history.

(56) References Cited

U.S. PATENT DOCUMENTS

| 5,532,576 | A  | * | 7/1996 | MacRobbie et al. | ......... | 323/274 |
| 5,570,005 | A  | * | 10/1996 | Hardee et al. | .............. | 323/314 |
| 6,548,993 | B1 | * | 4/2003 | Rutyna et al. | .............. | 323/288 |
| 6,711,071 | B2 | * | 3/2004 | Mizuno et al. | ......... | 365/189.09 |
| 6,795,366 | B2 | * | 9/2004 | Lee | ........................... | 365/226 |

* cited by examiner

*Primary Examiner*—Matthew V. Nguyen
(74) *Attorney, Agent, or Firm*—Marshall, Gerstein & Borun LLP

(57) ABSTRACT

The present invention discloses a voltage up converter, including: a detector for detecting a level of an internal power to generate the internal power higher than an external power; an asymmetrical oscillator for generating a frequency in which a high level width and a low level width are different according to the output from the detector; and a pump for generating the internal power by performing a pumping operation according to the output from the asymmetrical oscillator.

16 Claims, 6 Drawing Sheets

VOLTAGE UP CONVERTER

This application relies for priority upon Korean Patent Application No. 2004-0027089 filed on Apr. 20, 2004, the contents of which are herein incorporated by reference in their entirety.

BACKGROUND

1. Field of the Invention

The present invention relates to a voltage up converter, and more particularly to, a voltage up converter which can improve voltage up efficiency.

2. Discussion of Related Art

In general, a voltage up converter generates a power voltage having a higher internal power level than that of an external power, by using the external power. Hereinafter, the external power is referred to as VDD and the internal power is referred to as VPP.

The VDD itself has a high power level. Therefore, a doubler (pump for generating a power twice as high as the external power) can generate a high internal power. For example, the doubler can generate 3V of VPP voltage level by using 2.5V of VDD.

However, as the external power is gradually lowered, the doubler is not able to generate a high internal power. Here, a tripler (pump for generating a power three times as high as the external power) has been suggested. For example, the tripler can generate 3.5V of internal power by using 1.5V of external power.

FIG. 1 is a block diagram illustrating a conventional voltage up converter using a tripler. The operation of the conventional voltage up converter of FIG. 1 will now be explained with reference to FIG. 2.

A detector 10 detects a VPP potential, and outputs a start signal start when the VPP potential is lower than a specific potential. An oscillator 20 is operated according to the start signal start, for generating a signal osc having a constant period as shown in FIG. 2. A controller 30 is operated according to the output signal osc from the oscillator 20, for generating first and second control signals control1 and control2 as shown in FIG. 2. A pump 40 generates a VPP power according to the first and second control signals control1 and control2. FIG. 3 is a detailed circuit diagram illustrating the pump 40. The operation of the pump 40 will now be explained with reference to FIG. 3.

When an external control signal t1 is enabled in a high level, a transistor TR0 of a first pump 40a is turned on, and a boot node boot is charged by a VDD power. The external control signal t1 is disabled in a low level, and the first control signal control1 is enabled at the rising edge of the output signal osc from the oscillator 20. Accordingly, the first pump 40a is operated. That is, the first control signal control1 is applied to a capacitor C1 of the first pump 40a, and thus a potential of the boot node boot becomes 2×VDD, which is higher than the external power.

When an external control signal t2 is enabled in a high level, a transistor TR1 of the first pump 40a is turned on, and charges of the boot node boot are transmitted to a pump node pump of a second pump 40b.

The external control signal t2 is disabled in a low level, and the second control signal control2 is enabled at the falling edge of the output signal osc from the oscillator 20. Therefore, the second pump 40b is operated. That is, the second control signal control2 is applied to a capacitor C2 of the second pump 40b, and thus a potential of the pump node pump becomes 'potential of the pump node+VDD'. The maximum potential which can be pumped by the second pump 40b becomes 3×VDD.

When an external control signal t3 is enabled in a high level, a transistor TR2 is turned on, and the VPP power increases by charge sharing between the pump node pump and the VPP power.

Thereafter, the external control signal t3 is disabled.

The VPP power gradually increases by repeating the above pumping operation. When the VPP power reaches a target level, the start signal start is disabled to stop the pumping operation.

However, after the operation of the first pump 40a controlled by the first control signal control1, the level of the boot node boot of the first pump 40a tends to be continuously lowered after the rising edge of the first control signal control1. The boot node boot of the first pump 40a boosted by the first control control1 is one node of the capacitor C1, and the potential of the boot node boot is gradually lowered due to variations of an environment and a leakage current of the capacitor C1. In addition, charge sharing between the boot node boot and the pump node pump is not charge sharing using normal complete charges. That is, a smaller amount of charges than a pumping amount are supplied to the pump node pump due to the leakage current.

As described above, dropping of the boot node boot by the leakage current and the variations of the environment reduce efficiency of the tripler. The dropping of the boot node boot is more serious when the oscillator 20 has a long period. It is because the dropping of the boot node boot occurs for half a period of the oscillator 20.

In the general output signal osc from the oscillator 20, a low width (LW of FIG. 2) and a high width (HW of FIG. 2) are identical in one period. As a result, the output signal osc from the oscillator 20 having such a time width reduces efficiency of the tripler.

SUMMARY OF THE INVENTION

The present invention is directed to a voltage up converter which can minimize a dropping time of a boot node by a leakage current and variations of an environment, by controlling an output from an oscillator which causes dropping of the boot node by the leakage current and the variations of the environment to have an asymmetrical time width, instead of a symmetrical time width.

One aspect of the present invention is to provide a voltage up converter, including: a detector for detecting a level of an internal power to generate the internal power higher than an external power; an asymmetrical oscillator for generating a frequency in which a high level width and a low level width are different according to the output from the detector; and a pump for generating the internal power by performing a pumping operation according to the output from the asymmetrical oscillator.

BRIEF DESCRIPTION OF THE DRAWINGS

A more complete understanding of the present invention may be had by reference to the following description when taken in conjunction with the accompanying drawings in which.

DETAILED DESCRIPTION OF PREFERRED EMBODIMENTS

Figure 1:
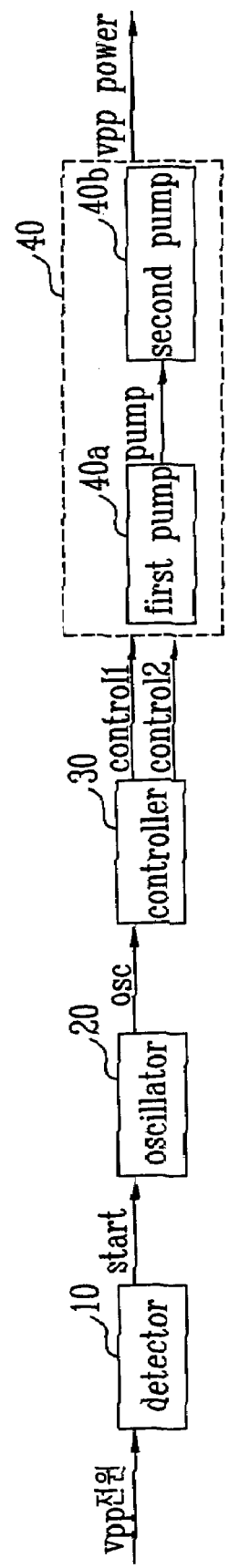
FIG. 1 is a block diagram illustrating a conventional voltage up converter.
Figure 2:
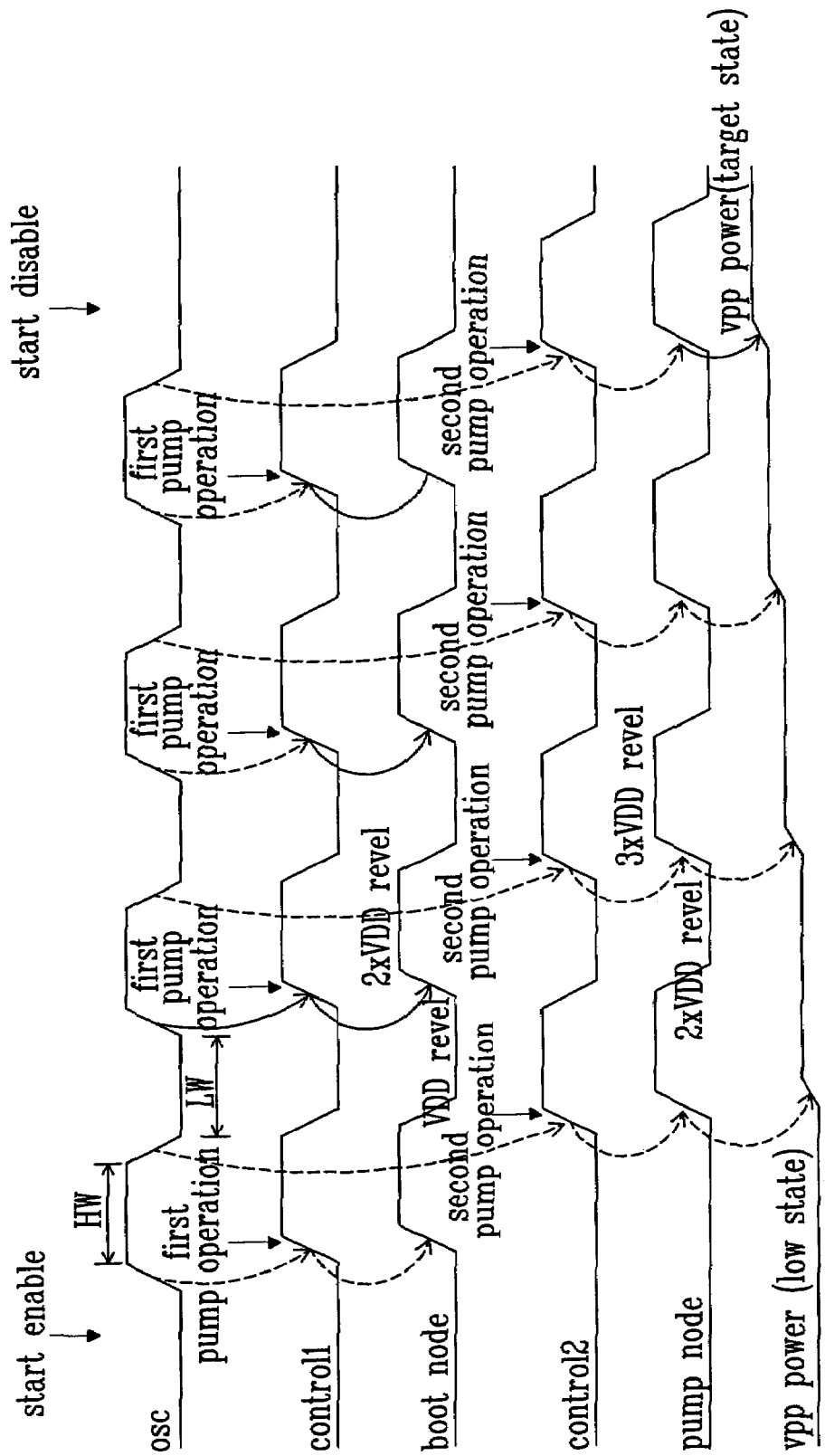
FIG. 2 is a waveform diagram showing the operation of the conventional voltage up converter of FIG. 1.

A voltage up converter in accordance with a preferred embodiment of the present invention will now be described in detail with reference to the accompanying drawings. Wherever possible, the same reference numerals will be used throughout the drawings and the description to refer to the same or like parts.

Figure 4:
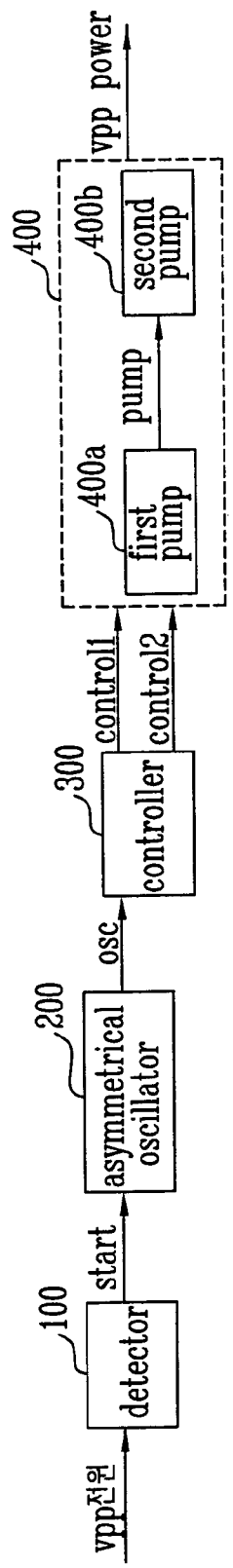
FIG. 4 is a block diagram illustrating a voltage up converter in accordance with a preferred embodiment of the present invention.

FIG. 4 is a block diagram illustrating the voltage up converter in accordance with the preferred embodiment of the present invention. The operation of the voltage up converter will now be explained with reference to FIG. 6.

Figure 6:
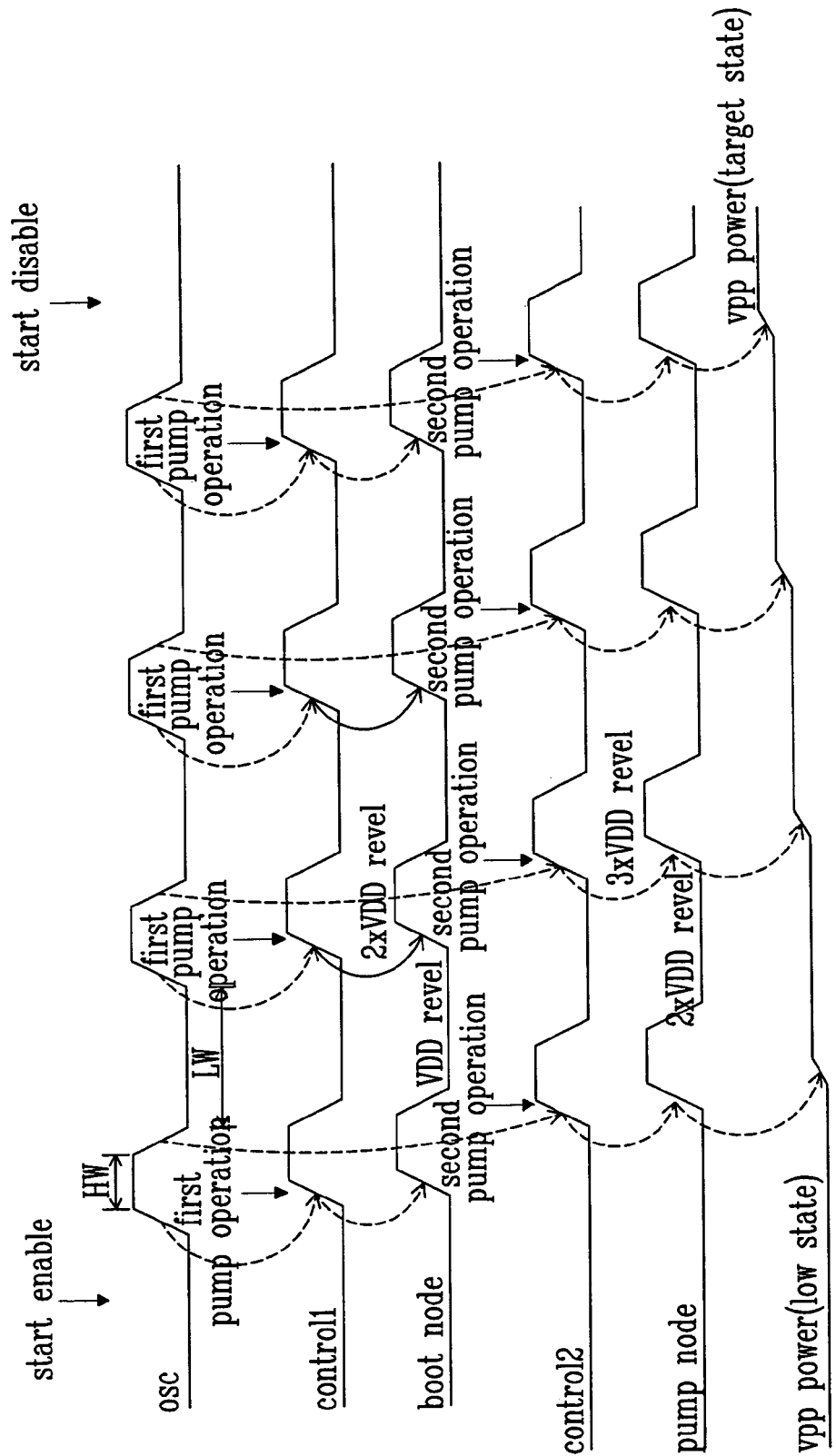
FIG. 6 is a waveform diagram showing the operation of the voltage up converter of FIG. 4.

A detector 100 detects a VPP potential, and outputs a start signal start when the VPP potential is lower than a specific potential. An asymmetrical oscillator 200 is operated according to the start signal start, for generating a signal osc in which a high level width HW and a low level width LW are different, namely, asymmetrical as shown in FIG. 6. The high level width HW is smaller than the low level width LW. A controller 300 is operated according to the output signal osc from the asymmetrical oscillator 200, for generating first and second control signals control1 and control2 as shown in FIG. 6. The first control signal control1 is enabled at the rising edge of the output from the asymmetrical oscillator 200, but the second control signal control2 is enabled at the falling edge of the output from the asymmetrical oscillator 200. Because the high level width HW of the asymmetrical oscillator 200 is smaller than that of the conventional oscillator, the second control signal control2 is relatively rapidly generated after generation of the first control signal control1.

It is thus possible to efficiently restrict dropping of a pump node pump by a leakage current and variations of an environment resulting from a long time difference between the first control signal control1 and the second control signal control2. The time difference between the first control signal control1 and the second control signal control2 is till a completion time of the operation of the first pump 400a by the first control signal control1.

Figure 3:
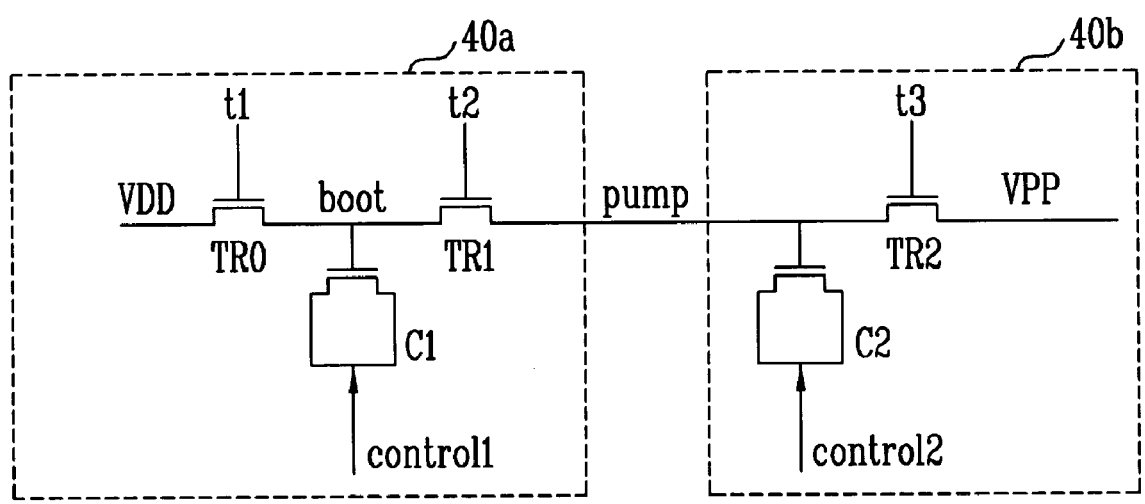
FIG. 3 is a detailed circuit diagram illustrating first and second pumps of FIG. 1.

A pump 400 generates a VPP power according to the first and second control signals control1 and control2. FIG. 3 shows a detailed configuration of the pump 400.

When an external control signal t1 is enabled in a high level, a transistor TR0 of the first pump 400a is turned on, and a boot node boot is charged by a VDD power. The external control signal t1 is disabled in a low level, and the first control signal control1 is enabled at the rising edge of the output signal osc from the asymmetrical oscillator 200. Accordingly, the first pump 400a is operated. That is, the first control signal control1 is applied to a capacitor C1 of the first pump 400a, and thus a potential of the boot node boot becomes 2×VDD, which is higher than the external power.

When an external control signal t2 is enabled in a high level, a transistor TR1 of the first pump 400a is turned on, and charges of the boot node boot are transmitted to a pump node pump of a second pump 400b.

The external control signal t2 is disabled in a low level, and the second control signal control2 is enabled at the falling edge of the output signal osc from the asymmetrical oscillator 200. Therefore, the second pump 400b is operated. That is, the second control signal control2 is applied to a capacitor C2 of the second pump 400b, and thus a potential of the pump node pump becomes 'potential of the pump node+VDD'. The maximum potential which can be pumped by the second pump 400b becomes 3×VDD.

When an external control signal t3 is enabled in a high level, a transistor TR2 is turned on, and the VPP power increases by charge sharing between the pump node pump and the VPP power.

Thereafter, the external control signal t3 is disabled.

The VPP power gradually increases by repeating the above pumping operation. When the VPP power reaches a target level, the start signal is disabled to stop the pumping operation.

Figure 5:
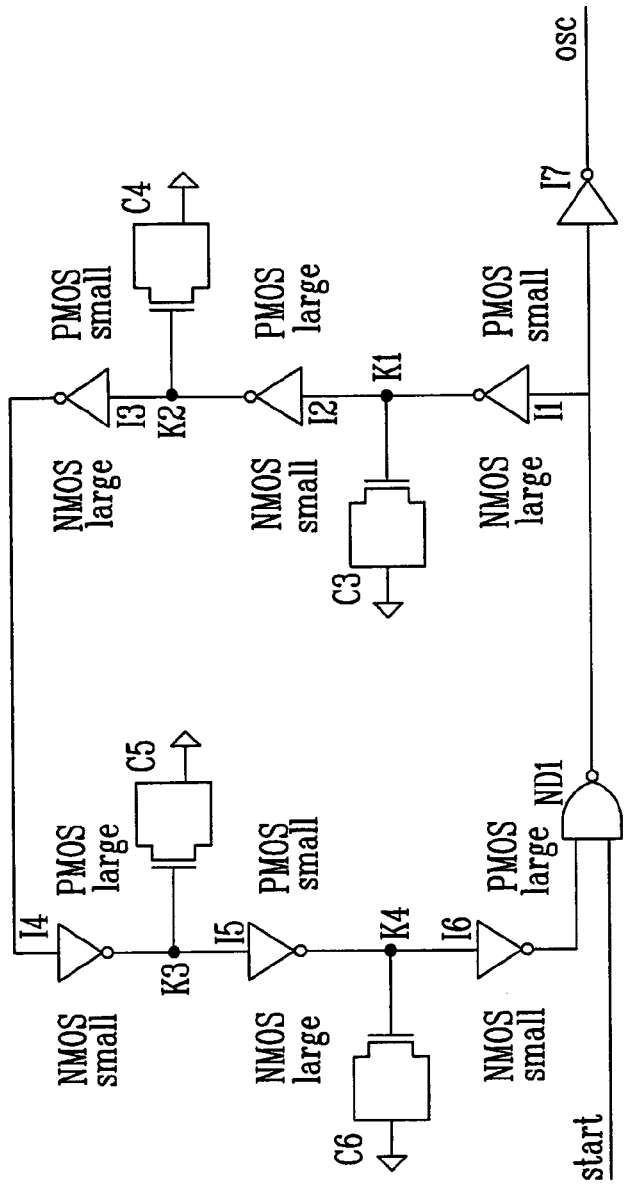
FIG. 5 is a detailed circuit diagram illustrating an asymmetrical oscillator of FIG. 4.

FIG. 5 is a detailed circuit diagram illustrating the asymmetrical oscillator 200 of FIG. 4.

When the start signal start is high, a NAND gate ND1 inverts an output from an inverter I6 and outputs the inverted signal. Inverters I2 to I5 are connected in series between an output terminal of the NAND gate ND1 and the inverter I6. An inverter I7 is coupled between the NAND gate ND1 and the output terminal osc of the asymmetrical oscillator 200.

A capacitor C3 is coupled between a node K1 which is a contact point between an output from the inverter I1 and an input terminal of the inverter I2 and a ground terminal. A capacitor C4 is coupled between a node K2 which is a contact point between an output from the inverter I2 and an input terminal of the inverter I3 and the ground terminal. A capacitor C5 is coupled between a node K3 which is a contact point between an output from the inverter I4 and an input terminal of the inverter I5 and the ground terminal. A capacitor C6 is coupled between a node K4 which is a contact point between an output from the inverter I5 and an input terminal of the inverter I6 and the ground terminal. The output from the inverter I7 becomes the final output from the asymmetrical oscillator 200. The output from the NAND gate ND1 is fed back to the NAND gate ND1 through the inverters I1 to I6, to generate an oscillation frequency.

Figure 7:
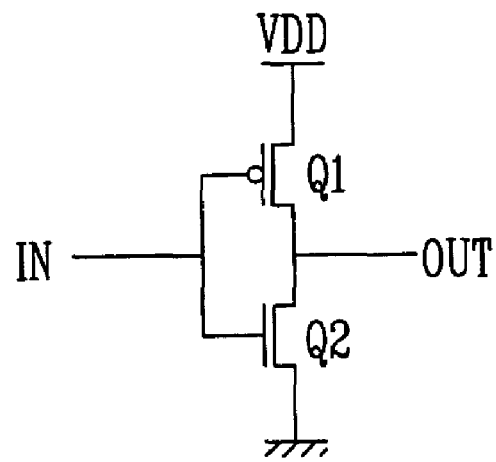
FIG. 7 is a detailed circuit diagram illustrating an inverter of FIG. 4.

As illustrated in FIG. 7, each of the inverters I1 to I6 includes a PMOS transistor Q1 which is a pull-up transistor and an NMOS transistor Q2 which is a pull-down transistor. When an input signal IN is high, the pull-down transistor Q1 is turned on and an output OUT is low, and when the input signal IN is low, the pull-up transistor Q1 is turned on and the output OUT is high.

In order to obtain an asymmetrical output, namely an output in which a high level width HW and a low level width LW are different, the inverters I1 to I6 are formed as follows.

In the inverter I1, a size of an NMOS transistor is larger than that of a PMOS transistor. In the inverter I2, a size of an NMOS transistor is smaller than that of a PMOS transistor. In the inverter I3, a size of an NMOS transistor is larger than that of a PMOS transistor. In the inverter I4, a size of an NMOS transistor is smaller than that of a PMOS transistor. In the inverter I5, a size of an NMOS transistor is larger than that of a PMOS transistor. In the inverter I6, a size of an NMOS transistor is smaller than that of a PMOS transistor. That is, the basis configuration of the asymmetrical oscillator 200 is a ring oscillator, and pull-up transistors and pull-down transistors of the inverters composing the ring oscillator are different in size.

Figure 8:
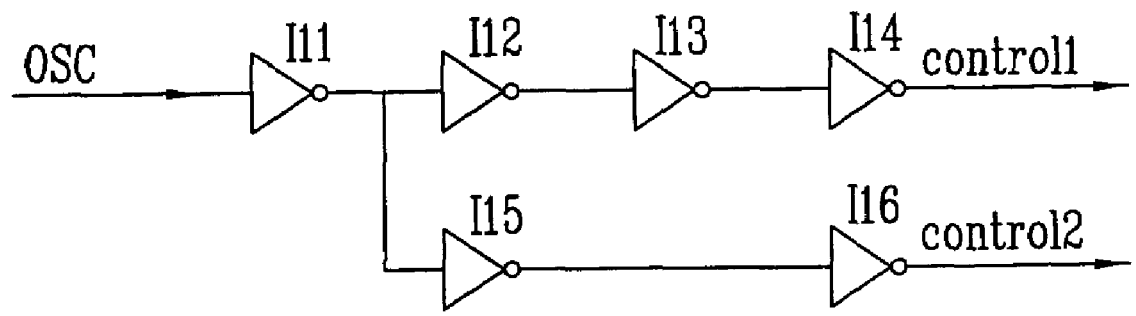
FIG. 8 is a detailed circuit diagram illustrating a controller of FIG. 4.

FIG. 8 is a detailed circuit diagram illustrating the controller 300 of FIG. 4.

The first control signal control1 and the output signal osc from the asymmetrical oscillator 200 are in-phase, and the second control signal control1 and the output signal osc from the asymmetrical oscillator 200 are anti-phase. The output signal osc from the asymmetrical oscillator 200 is outputted as the first control signal control1 through the inverters I1 to I4. In addition, the output signal osc from the asymmetrical oscillator 200 is outputted as the second control signal control2 through the inverters I5 and I6.

Accordingly, when the first control signal control1 is transited to a high level, the boot node boot of FIG. 3 becomes 2×VDD. This level is transmitted to the pump node pump when the external control signal t2 is enabled. Thereafter, the first control signal control1 is transited to a low level. Here, the external control signal t1 is enabled to precharge the boot node boot with VDD. In addition, when the second control signal control2 is transited to a high level, the pump node pump is increased to 3×VDD. Here, the external control signal t3 is enabled to supply charges of the pump node pump to VPP. Thereafter, the second control signal control2 is transited to a low level, and the first control signal control1 is transited to a high level. The VPP pumping operation is performed by repeating the above pumping operation.

As discussed earlier, in accordance with the present invention, the voltage up converter can improve efficiency of the tripler by using the asymmetrical oscillator, reduce consumption of external power current, and stabilize the operation of the whole device.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A voltage up converter, comprising:
   a detector for detecting a level of an internal power to generate the internal power higher than an external power and outputting a start signal;
   an asymmetrical oscillator for generating a frequency in which a high level width and a low level width are different according to the start signal from the detector; and
   a pump for generating the internal power by performing a pumping operation according to the output from the asymmetrical oscillator, and
   wherein the asymmetrical oscillator is a ring oscillator including a plurality of inverters, each of the inverters includes a pull-up transistor and a pull-down transistor, and the pull-up transistors and the pull-down transistors are different in size.

2. A voltage up converter, comprising:
   a detector for detecting a level of an internal power to generate the internal power higher than an external power and outputting a start signal;
   an asymmetrical oscillator for generating a frequency in which a high level width and a low level width are different according to the start signal from the detector;
   a controller for generating first and second control signals according to the output from the asymmetrical oscillator; and
   a pump for generating the internal power by performing a pumping operation according to the first and second control signals, and
   wherein the asymmetrical oscillator is a ring oscillator including a plurality of inverters, each of the inverters includes a pull-up transistor and a pull-down transistor, and the pull-up transistors and the pull-down transistors are different in size.

3. The voltage up converter of claim 2, wherein a high level width of the output from the asymmetrical oscillator is smaller than a low level width thereof.

4. The voltage up converter of claim 2, wherein the pump includes:
   a first pump for generating a first voltage higher than the external power, by performing a pumping operation according to the first control signal; and
   a second pump for generating an internal power higher than the first voltage, by performing a pumping operation according to the second control signal.

5. The voltage up converter of claim 4, wherein the first pump includes:
   a first switching device for switching a boot node to the external power level according to a first external signal;
   a first capacitor for generating the first voltage by increasing a potential of the boot node according to the first control signal; and
   a second switching device for outputting the first voltage according to the first external signal.

6. The voltage up converter of claim 5, wherein each of the first and second switching devices is a transistor.

7. The voltage up converter of claim 4, wherein the second pump comprises:
   a second capacitor for pumping a pump node to a higher voltage than the first voltage according to the second control signal; and
   a third switching device for transmitting a potential of the pump node to an output terminal according to a second external signal.

8. The voltage up converter of claim 7, wherein the third switching device is a transistor.

9. The voltage up converter of claim 1, wherein the asymmetrical oscillator comprises:
   a first, a second, a third, a fourth, a fifth and a sixth inverters connected in series between a first node and a second node;
   a NAND gate for outputting a logic signal in response to an output signal of the sixth inverter and the start signal;
   a seventh inverter coupled between the first node and the output terminal of the asymmetrical oscillator,
   a first capacitor connected between a ground terminal and a third node being connected between the first inverter and the second inverter;
   a second capacitor connected between the ground terminal and a fourth node being connected between the second inverter and the third inverter;
   a third capacitor connected between the ground terminal and a fifth node being connected between the fourth inverter and the fifth inverter; and
   a fourth capacitor connected between a ground terminal and a sixth node being connected between the fifth inverter and the sixth inverter, and
   wherein an output from the seventh inverter becomes the final output from the asymmetrical oscillator.

10. The voltage up converter of claim 1, wherein the pull-up transistor includes a PMOS transistor and the pull-down transistor includes an NMOS transistor.

11. The voltage up converter of claim 9, wherein each of the first, third and fifth inverters includes a PMOS transistor and a NMOS transistor, with a size of the NMOS transistor is larger than a size of the PMOS transistor.

12. The voltage up converter of claim 9, wherein each of the second, fourth and sixth inverters includes a PMOS transistor and a NMOS transistor, with a size of the NMOS transistor is smaller than a size of the PMOS transistor.

13. The voltage up converter of claim 2, wherein the asymmetrical oscillator comprises:
   a first, a second, a third, a fourth, a fifth and a sixth inverters connected in series between a first node and a second node;
   a NAND gate for outputting a logic signal in response to an output signal of the sixth inverter and the start signal;
   a seventh inverter coupled between the first node and the output terminal of the asymmetrical oscillator,
   a first capacitor connected between a ground terminal and a third node being connected between the first inverter and the second inverter;
   a second capacitor connected between the ground terminal and a fourth node being connected between the second inverter and the third inverter;
   a third capacitor connected between the ground terminal and a fifth node being connected between the fourth inverter and the fifth inverter; and
   a fourth capacitor connected between the ground terminal and a sixth node being connected between the fifth inverter and the sixth inverter, and
   wherein an output from the seventh inverter becomes the final output from the asymmetrical oscillator.

14. The voltage up converter of claim 2, wherein the pull-up transistor includes a PMOS transistor and the pull-down transistor includes an NMOS transistor.

15. The voltage up converter of claim 13, wherein each of the first, third and fifth inverters includes a PMOS transistor and a NMOS transistor, with a size of the NMOS transistor is larger than a size of the PMOS transistor.

16. The voltage up converter of claim 13, wherein each of the second, fourth and sixth inverters includes a PMOS transistor and a NMOS transistor, with a size of the NMOS transistor is smaller than a size of the PMOS transistor.

* * * * *